United States Patent [19]

Klinner

[11] Patent Number: 4,539,798
[45] Date of Patent: Sep. 10, 1985

[54] APPARATUS AND METHOD FOR CONVEYING AND/OR TREATING CROP

[75] Inventor: Wilfred E. Klinner, Milton Keynes, United Kingdom

[73] Assignee: National Research Development Corporation, London, England

[21] Appl. No.: 517,445

[22] Filed: Jul. 26, 1983

Related U.S. Application Data

[63] Continuation-in-part of Ser. No. 477,872, Mar. 23, 1983.

[30] Foreign Application Priority Data

Mar. 26, 1982 [GB] United Kingdom ............... 8209019
Jul. 29, 1982 [GB] United Kingdom ............... 8221910
Mar. 11, 1983 [GB] United Kingdom ............... 8306762

[51] Int. Cl.³ ............................................ A01D 89/00
[52] U.S. Cl. .................................. 56/16.4; 56/364
[58] Field of Search ................. 56/16.4, 14.4, 364

[56] References Cited

U.S. PATENT DOCUMENTS

| | | | |
|---|---|---|---|
| 3,676,988 | 7/1972 | Hinser-Lienhard | 56/364 |
| 3,872,657 | 3/1975 | Ramacher et al. | 56/364 |
| 3,924,391 | 12/1975 | Cheatum | 56/364 |
| 4,182,099 | 1/1980 | Davis et al. | 56/16.4 |
| 4,196,567 | 4/1980 | Davis et al. | 56/16.4 |
| 4,233,803 | 11/1980 | Davis et al. | 56/16.4 |
| 4,411,127 | 10/1983 | Diederich, Jr. | 56/364 |

FOREIGN PATENT DOCUMENTS

| | | | |
|---|---|---|---|
| 1482107 | 6/1970 | Fed. Rep. of Germany | 56/16.4 |
| 2147375 | 9/1975 | Fed. Rep. of Germany | |
| 304122 | 12/1972 | Netherlands | |
| 2053645 | 2/1981 | United Kingdom | |
| 2099272 | 12/1982 | United Kingdom | |

Primary Examiner—Paul J. Hirsch
Attorney, Agent, or Firm—Cushman, Darby & Cushman

[57] ABSTRACT

Apparatus for picking up cut crop from the ground or from a mower comprises a rotor driven so that the rotor picks up crop and carries the crop upwardly and rearwardly over the rotor. A hood extends over the front of the rotor and defines therewith a crop flow passage along which the crop is conveyed by the rotor. The hood is pivotally mounted by arms to side plates of the frame, and is movable along a predetermined path which is eccentric relative to the axis of the rotor. The hood is movable in response to and by the effect of the crop to effect automatic adjustment of the clearance at the entrance to the crop flow passage. An increased crop load moves the hood upwardly and rearwardly against the effect of gravity and optionally against a biasing spring. In other examples, only a front portion of the hood moves, and this may comprise a transverse roller suspended on a hinge above the entrance to the crop flow passage.

9 Claims, 24 Drawing Figures

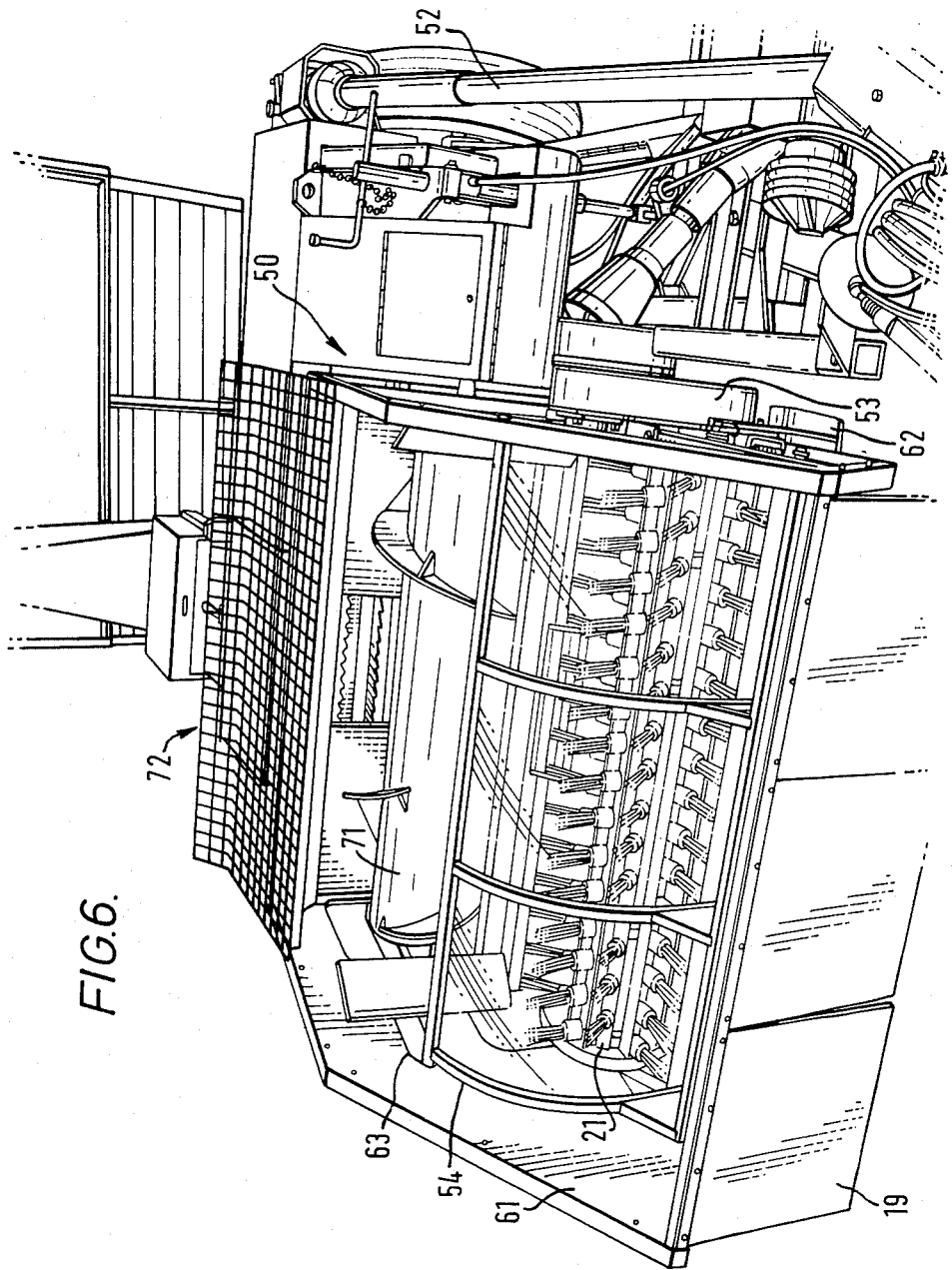

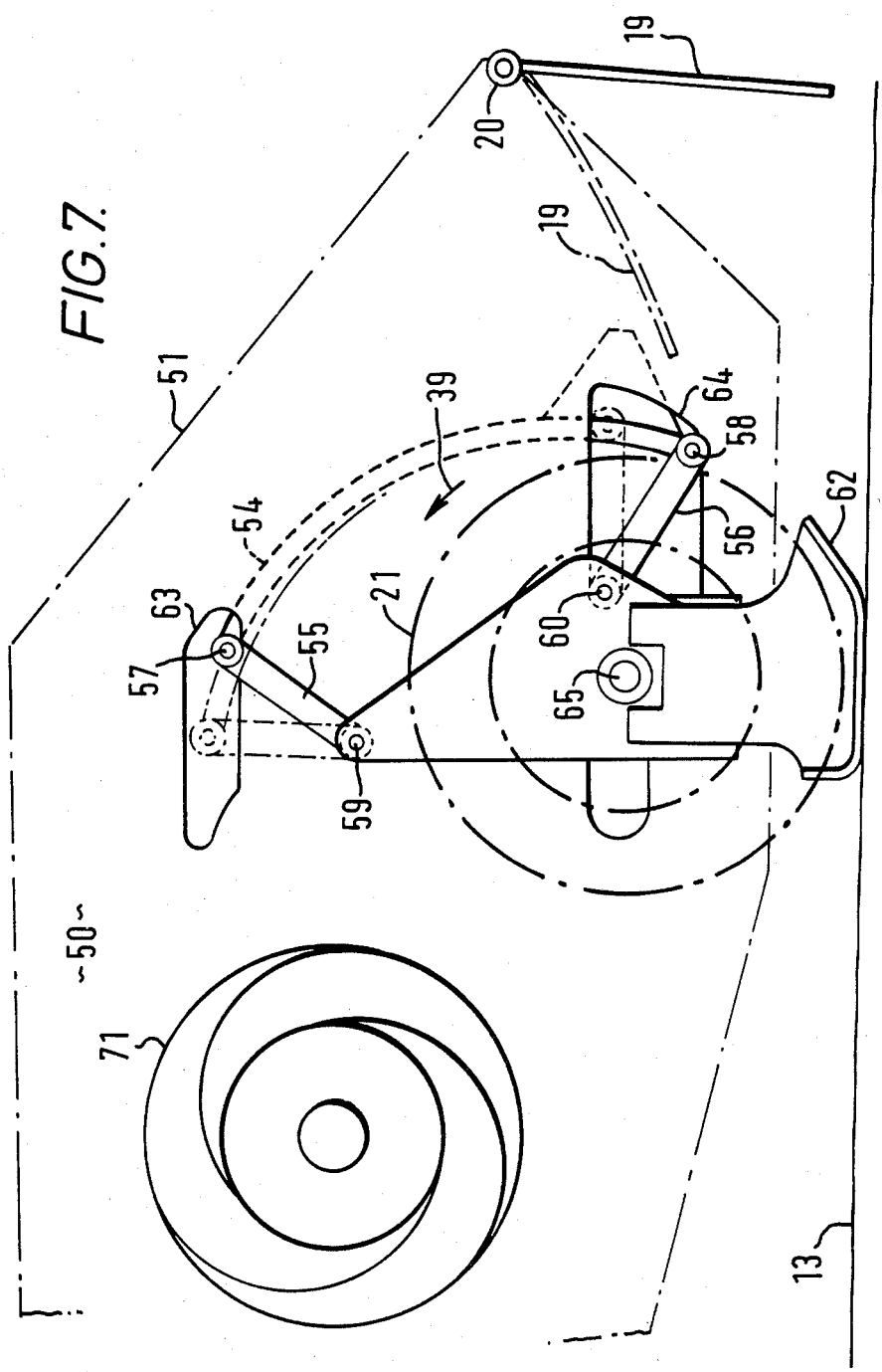

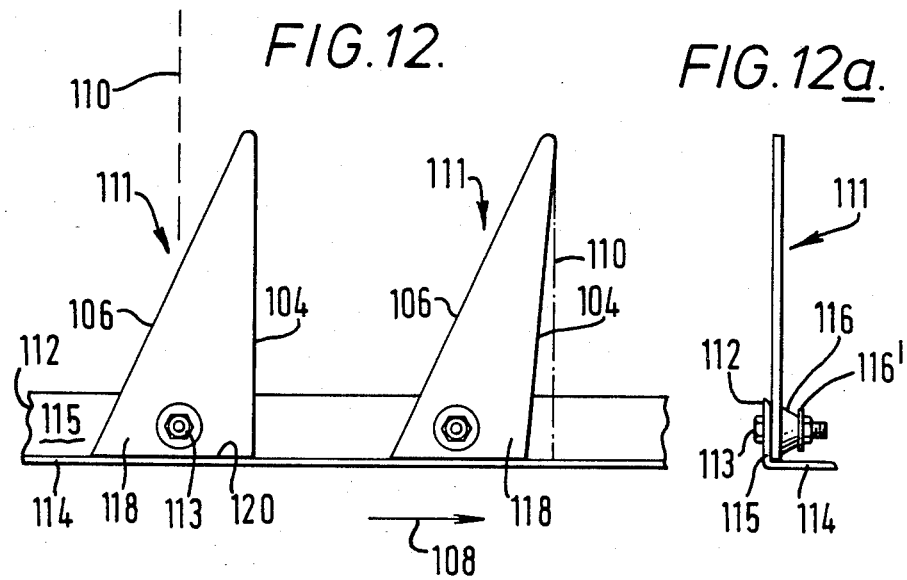
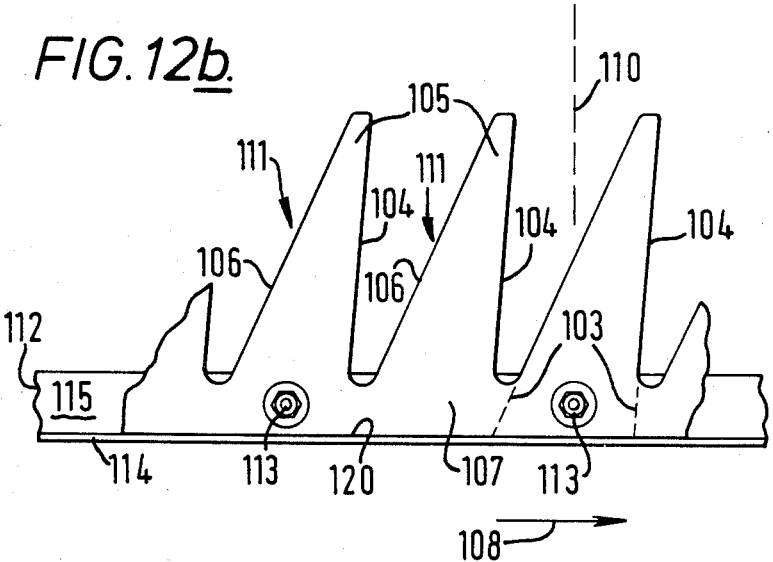

APPARATUS AND METHOD FOR CONVEYING AND/OR TREATING CROP

This is a continuation-in-part of application Ser. No. 477,872, filed Mar. 23, 1983.

The present invention relates to apparatus and method for conveying and/or treating crop, and relates in particular but not exclusively to apparatus including a rotor for picking up previously cut forge crops such as grass from the ground and for conveying such crops into chopping, baling or other harvesting apparatus, whether or not such action includes conditioning of the crop.

In order to make it possible for high-speed crop engaging rotors to lift fibrous crops for purposes of treating and/or conveying the material, it is necessary to provide a housing, comprising for example a hood, shroud or cowling, over at least the front part of each rotor. The shape of the cowling and its relative position to the rotor, particularly the vertical clearance above the crop layer to be engaged and the radial clearance at the intake and exit regions, vitally affect the performance and power requirement of the unit as a whole. Normally, but not necessarily, the exit clearance needs to be greater than the intake clearance, so that crop can start to disengage itself from the rotor elements early and a compact stream is formed on completion of the process. The shape of the cowling in the exit region determines the trajectory of the resultant crop stream.

Because crop yields may vary from very light to exceptionally heavy, adjustment is needed in the vertical and radial clearances of the cowling at the intake region. In a sparse crop, both clearances need to be small, to avoid crop being thrown forwardly and rejected by the rotor. The converse applies when bulky swaths or windrows are to be collected. In conventional machines a manual adjustment is usually provided which can be set according to estimated crop conditions.

It is one object of the present invention to avoid or reduce the difficulties of adjusting the crop flow passage associated with a crop pick-up rotor.

A second problem concerns small amounts of stray material which are sometimes present beneath the main crop stream after leaving the rotor, and these can be deposited back onto the ground prematurely in a crop treatment mechanisms if precautions are not taken. In a pick-up device one known approach to this problem is to provide a transfer mechanism such as a stripper or impeller rotor to direct stray particles downstream.

It is another object of the present invention to provide means for avoiding or reducing loss of crop which strays from the main stream of crop leaving a crop pick-up rotor.

According to the present invention in a first aspect there is provided apparatus for conveying and/or treating crop comprising a mobile frame for movement across the ground, means for conveying crop, a hood at the front of the conveying means defining a crop flow passage, drive means for driving the conveying means for conveying crop, and mounting means for mounting the hood or a portion thereof so as to be movable relative to the frame during operation, the hood or the hood portion being movable in response to, and by the effect of, the crop to effect automatic adjustment of the clearance at the entrance to the crop flow passage.

The present invention is applicable where the conveying means takes a number of different forms, for example a pair of rotors mounted for rotation about vertical or near vertical axes (such as are found in drum mowers and for example as shown in our published UK pending patent application GB 2081566A), but the principal use of the present invention occurs where the conveying means comprises a rotor mounted for rotation about an axis substantially parallel to the ground for picking up and conveying crop, the hood extending over the front of the rotor and defining with the rotor the crop flow passage along which crop is conveyed by the rotor, and the drive means being arranged to drive the rotor in rotation in a sense such that the rotor picks up crop and carries the crop upwardly and rearwardly over the rotor. Unless otherwise indicated, where reference is made hereinafter to a rotor, the term is intended to indicate a horizontal rotor as set out above.

The invention has particular advantage in some forms in which the mounting means are such as to provide circumferential movement of the hood or the movable hood portion relative to the frame and around the rotor. The circumferential movement may lie along a circle which is concentric with the centre of the rotor, or more usually the circumferential movement will lie along a curved path spaced from and lying around the outer envelope of the rotor but not along a circular path. In general the term circumferential movement of the hood portion means movement along a curved path spaced from the lying around the outer envelope of the rotor and such movement may or may not be concentric relative to the rotor. The movement of the hood by which the automatic adjustment of clearance is made may include a component which is a radially outward movement relative to the rotor, and it may differ in magnitude from one side and one end of the rotor housing to the other, but in this preferred form of the invention, the movement which produces the automatic adjustment of the clearance is preferably a circumferential movement around the rotor.

Preferably the said hood or hood portion is mounted in such a manner that an increase in crop load increases both the vertical clearance between the front of the hood and the ground and the horizontal clearance between the front of the hood and the rotor at the entrance to the crop flow passage.

Also it is preferred that the mounting means constrains the said hood or hood portion to move along a substantially predetermined path in response to, and by the effect of, changes in crop load. Adjustment means may be provided for selectively varying the predetermined path of movement of the hood or hood portion. Also it may be arranged that the said predetermined path produces different variations of clearances at the entrance and exit of the crop flow passage during movement of the hood or hood portion. In such a case there may be provided means for adjusting the relationship between the different variations in clearances at the entrance and exit of the crop flow passage.

Conveniently the relationship between the different variations in clearances at the inlet and outlet of the crop passage can be adjusted by varying the mounting of the hood or the movable part thereof.

Normally it will be arranged that the hood or said movable portion thereof is movable in response to, and by the effect of, an increase in crop load to effect an overall increase in the clearance presented to the crop along the crop flow passage. By this is meant that the clearance presented to the crop along the crop passage is not normally at an point reduced in response to an increase in crop load, although it may be that the clearance is at some points unaltered. However, were it required, for example, that an increase in clearance at the front is compensated by a decrease in clearance at the rear of the housing, or vice versa, the present invention permits this to be achieved.

In one arrangement, the said movable hood portion comprises one or more cylindrical members extending across the front of the apparatus and positioned in the region of and below the front edge of a main hood member. For example the main hood member may be a fixed member, with the cylindrical member or members hanging or otherwise pivoted from the leading edge of the hood member. In another arrangement the cylindrical member or members may be mounted by spigots engaged in slots in side walls of the apparatus or in the end plates of the cylindrical member, so that the said movement of the members is achieved by the spigots sliding along the slots in the side walls or end plates.

It is to be appreciated that whereas in some forms the automatic adjustment is primarily concerned with variation in the horizontal and vertical clearance at the inlet to the crop passage, other forms of the invention are concerned particularly with variations in the clearances along the crop passage between the curved hood member and the rotor. It is also to be appreciated that of course embodiments of the invention may be produced which incorporate both forms of the invention.

Conveniently the hood or hood portion is biased towards a first position in which the entrance to the crop passage is restricted to a greater extent (that is to say giving a smaller clearance for crop) and is movable in response to, and by the effect of, crop towards a second position in which the entrance to the crop passage is restricted to a lesser extent.

The hood or said movable portion thereof may be biassed towards a position of greater restriction to crop (that is to say giving a smaller clearance for crop flow) by gravity, either alone or in combination with biassing means coupled between the frame and the hood or said movable portion thereof. The additional biasing means may act to increase or decrease the biasing effect due to gravity.

The actual mounting means for the hood or hood portion may take a wide variety of forms, yet still fulfil the requirements of the invention as set out above.

In some arrangements the mounting means may comprise a pivotal mounting by which the hood or hood portion is capable of pivoting about a single fixed axis relative to the frame, but in a number of preferred arrangements, the said mounting means comprises at least two mounting linkages spaced apart along the direction of the crop flow passage, the linkage being arranged to allow movement of the hood or hood portion upwardly and rearwardly but to constrain the hood to movement along a substantially predetermined path.

Each mounting linkage may comprise a pivotal mounting linkage which is pivoted to the hood or hood portion and to the frame, the spacing between the pivots on the linkages being different for different linkages along the crop passage, so that a different variation of clearance occurs at different positions along the crop passage. Each said mounting linkage may comprise an arm pivoted at one end to the hood or hood portion and pivoted at the other end to the frame.

In yet a another arrangement, the said mounting means may comprise spigots movably mounted in slots in substantially vertical side walls of the apparatus.

In yet other arrangements the mounting means may be formed partly or entirely by elastic links, to allow lateral differentiation in the response to different crop loads.

In one preferred form, the said frame includes a pair of laterally spaced side walls, the said hood being wider than the lateral spacing of the side walls and the upper edges of the side walls being arranged to form lower limit stops for the hood, movement of the hood above the side walls being produced by extension of independent elastic links in a non-predetermined path. It may be arranged that rollers or wheels are attached near the upper ends of the side walls to support and guide the overhanging hood and to minimise sliding friction, and that the rollers or wheels are made from resilient material to cushion the return movement of the hood.

It is to be appreciated that the said frame of the apparatus may include side plates of the general rotor housing.

In any of these arrangements, the hood or hood portion may be biased towards a position of greater restriction of crop by gravity, either alone or in combination with biasing means coupled between the frame and the hood or hood portion.

In some preferred arrangements, the said hood or said movable portion thereof may be formed by two or more hood sections positioned tranversely adjacent across the width of the apparatus relative to the intended direction of forward movement, such that the restriction on crop movement between the hood and the rotor may be varied to different extents at different positions across the width of the apparatus in dependence upon different amounts of crop presented at different positions across the width of the apparatus.

In addition to the features set out hereinbefore, it is particularly preferred that thereof may be provided a curtain member suspended at the front of the apparatus ahead of the inlet to the crop passage between the hood and the rotor, the curtain member being movable in response to and by the effect of crop between a first position in which the curtain member hangs freely and substantially vertically and a second position in which the curtain member trails non-vertically from its suspension region and provides a guide surface above the crop leading into the crop passage between the rotor and the hood.

There will now be set out a second aspect of the present invention which may be provided independently of, or in addition to, the first aspect of the invention which has been set out.

According to the present invention in a second aspect there is provided apparatus for conveying and/or treating crop comprising a mobile frame for movement across the ground, a rotor mounted for rotation about an axis substantially parallel to the ground for picking up and conveying crop, a hood extending over the front of the rotor, drive means for driving the rotor in rotation in a sense such that the rotor picks up crop, carries the crop upwardly and rearwardly over the rotor, and delivers the crop to a receiving region of the apparatus downstream of the rotor, and a guide member leading around and beneath a rear portion of the rotor for guiding crop which does not reach or escapes the said receiving region back under the rotor to be picked up and conveyed again by the rotor.

Conveniently the said guide member may be a curved concave member leading around and spaced from part of the underside of the rotor.

It is particularly preferred that the guide member is movably mounted relative to the frame to allow movement upwardly and rearwardly in response to and by the effect of atypical loads imposed at the leading edge of the guide member, such as inadvertant contact with the ground or a foreign object on the ground.

The guide member may be biassed forwardly and downwardly by gravity or by gravity in combination with biassing means acting between the guide member and the frame or by gravity acting against biassing means acting between the guide member and the frame.

There is also provided in accordance with the said first aspect of the present invention a method of conveying and/or treating crop comprising the steps of rotating about an axis substantially parallel to the ground a rotor for picking up and conveying crop along a crop flow passage, picking up crop by the rotor and carrying the crop upwardly and rearwardly over the rotor along a path between the rotor and a hood which extends over the front of the rotor and which defines with the rotor the said crop flow passage, and automatically adjusting the clearance at the entrance to the crop flow passage by moving the hood or a portion thereof on a mounting with the frame, in response to and by the effect of the crop presented to the rotor.

In general, these features of the invention which have been set out with regard to the apparatus aspects of the invention, are also provided in accordance with the method aspects of the invention.

The rotor referred to above may comprise any form of pick-up rotor, for example a rotor having a plurality of outwardly directed spring steel tines for picking up cut fodder crop such as grass. However the invention is particularly applicable when used with a rotor as set out in our published UK Patent 1322165, comprising a plurality of outwardly directed metal spokes in the form of V-shaped crop engaging elements, or a rotor as set out in our published pending UK Patent Application No. 2075816A, which comprises a brush-like structure having a multiplicity of stiff resilient elongate elements which are arranged in tufts of brush elements spaced apart along the axis of the rotor; or a rotor as set out in our published pending UK Patent Application Nos. 2099272A and 2107963A, both of which disclose pick-up and conditioning rotors in which the crop engaging elements are formed of thick, stiff, plastics sheeting.

Embodiments of the invention will now be described by way of example with reference to the accompanying drawings, in which:

FIGS. 6 and 6a are perspective views from the front and side respectively of a further embodiment of the invention for picking up cut crop and shows a movable curved hood in front of and partly above a rotor;

FIG. 7 is a diagrammatic side view of the apparatus shown in FIGS. 6 and 6a;

FIGS. 11 to 15 show various forms of crop engaging elements which may be used on rotors in embodiments of the invention.

Figure 1:
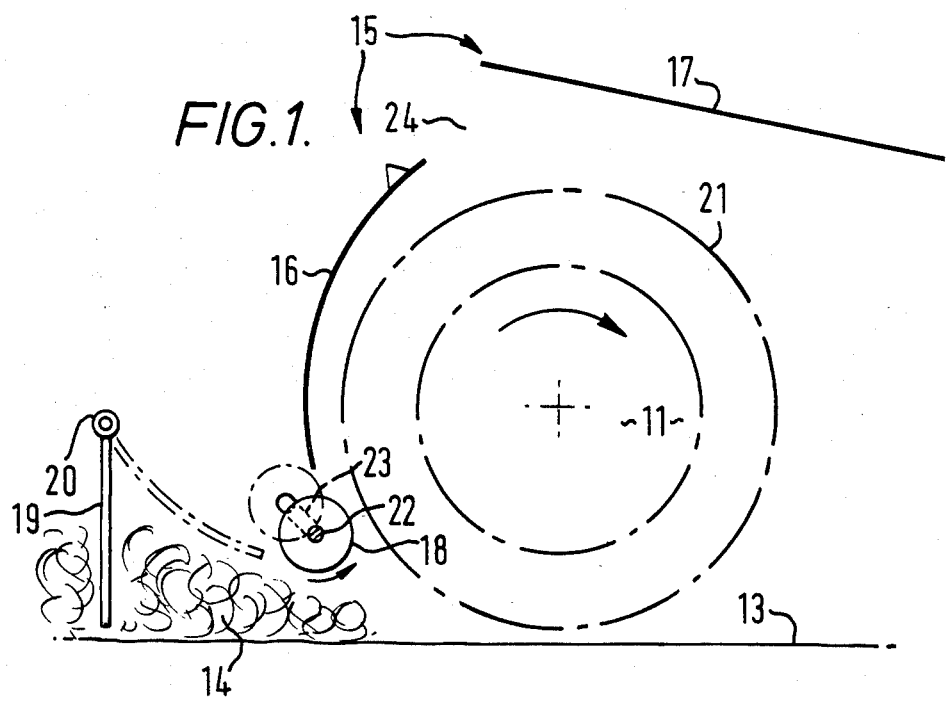
FIG. 1 is a diagrammatic side view of apparatus for picking up and conveying cut crop, embodying the invention.

Referring to FIG. 1, there is shown a crop pick-up apparatus comprising a rotor 11 mounted on a mobile main frame (not shown) for movement over the ground 13 to pick-up previously cut crop 14. A hood assembly or rotor housing is indicated generally at 15, and in this particular embodiment comprises a fixed hood portion 16, also referred to as a cowling or shroud, an overhead baffle or deflector 17, and a movable hood portion comprising a cylindrical inlet member 18 at the leading lower edge of the cowling 16. The inlet member 18 constitutes a portion of the hood assembly 15. There is also provided a freely-hanging, stiff curtain member 19 suspended from a transverse pivot bar 20.

The rotor 11 may comprise any form of rotary pickup mechanism, but preferably consists of a plurality of stiff resilient outwardly directed crop engaging elements, the outer periphery of which is indicated by a broken line 21. Conveniently the rotor 11 comprises a pick-up rotor as disclosed in one of our published UK Patent Application No. 2075816A, 2099272A and 2107963A. In the example shown in FIG. 1A, the rotor 11 is also rotated in a clockwise direction so as to pickup cut crop from the ground and to convey the crop upwardly and rearwardly over the rotor 11.

The apparatus shown in FIG. 1 embodies the invention by virtue of the inlet member 18 which comprises a closed-ended tube or roller 18 extending across the lower front region of the shroud or cowling 16 covering the front of the crop engaging rotor 11. A shaft or spindle 22 passing through the tubular inlet member 18 is located in slots 23 at side plates (not shown) of the rotor housing 15, the slots 23 being directed forwardly and upwardly. To save weight, the shaft or spindle 22 may be replaced by spigots attached to the end plates of the roller 18.

Where the crop is light, the inlet member 18 remains with the spindle 22 at the lowermost point of the slot 23, thus restricting the clearance between the inlet member 18 and the ground 13, and also the clearance between the inlet member 18 and the periphery 21 of the rotor 11. With increasing crop bulk, pressure is exerted on the underside of the inlet member 18 by the crop and this pressure increases beneath the tubular member 18 and to the rear of it, and in response to this the member 18 is lifted and forced to track in the direction of the slots 23. Thus when the apparatus encounters a larger bulk of crop on the ground, the clearance between the inlet member 18 and the ground, and also the clearance between the inlet member 18 and the rotor 21, are increased. Spring loading (not shown) may be used to reduce the effect of gravity on the cylinder 18, or may be used to increase the downward and rearward biassing effect, as dictated by particular circumstances. The inlet member 18 may be of metallic or non-metallic material.

After entering the space between the rotor 11 and the front shroud 16, the crop material is conveyed upwardly and to the rear of the apparatus beneath the baffle or deflector 17 above the rotor. The deflector 17 may be a flat or curved plate and can be connected to the front shroud 16. However, the gap shown and indicated at 24 between the shroud 16 and upper deflector 17 allows the operator to see the crop stream to check operation, and also facilitates, if desirable, the introduction and even distribution of additives in liquid or solid form.

Suspended in front of the shroud 16 is the protective curtain 19 from the rigid bar 20 preceding the rotor 11. The curtain 19 serves the additional purpose of guiding the crop 14 under the floating tubular member 18. The curtain 19 is shown in its rest position in full lines, and in broken lines there is shown the normal deflected position of the curtain 19 during forward movement of the apparatus over crop.

Figure 1A:
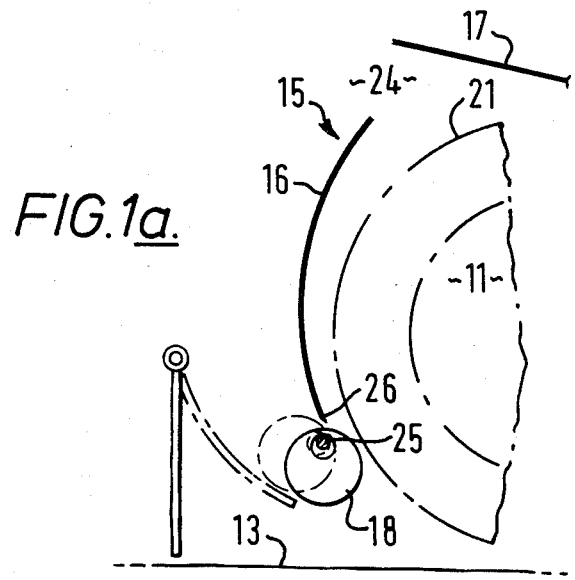
FIG. 1a shows a modification of a front portion of the housing of the apparatus shown in FIG. 1.

FIG. 1a shows a modification of the apparatus in FIG. 1, in which a simpler arrangement of the intake control system is shown. A full-width cylindrical input member 18, or a series of closed-ended cylindrical sections, is suspended from a fixed rail 25 extending across the intake region of the apparatus. The lower edge 26 of the front shroud 16 may be arranged to prevent the cylindrical input member 18 from making contact with the rotor 11, or additional stops (not shown) may be provided for this purpose. Under varying crop pressure, the tubular inlet member 18 pivots about the support bar 25 in the manner shown in full and broken lines, so as to increase or decrease both the horizontal and vertical clearances between the member 18 and the ground 13, and between the member 18 and the rotor 11. Where a number of short cylindrical members 18 are suspended from a common rail, it is a particular advantage that individual members 18 can be deflected angularly by differing amounts, depending on the crop bulk distribution across the width of a crop window. Thus, where little crop is presented to the apparatus a tight rotor clearance is maintained by the appropriate cylindrical inlet members 18, and, conversely, where a large volume of crop is presented to the apparatus, maximum deflection of a cylindrical inlet member 18 takes place, so as to increase the clearances at the inlet to the apparatus.

It is to be appreciated that various combinations of the systems shown in FIGS. 1 and 1a may be arranged.

Figure 2:
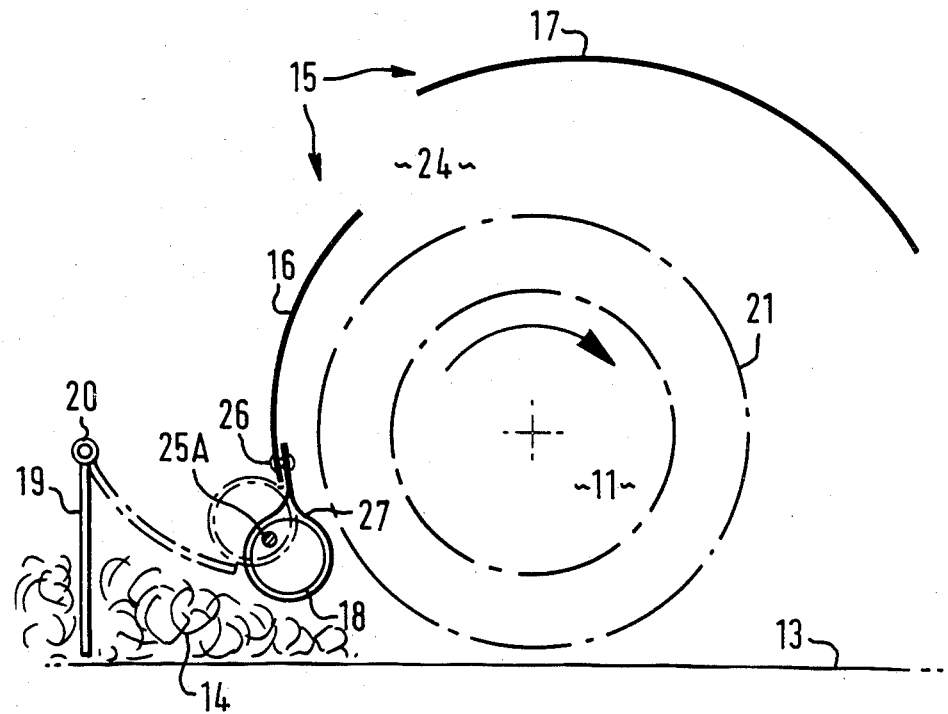
FIG. 2 shows a further modification of the apparatus shown in FIG. 1.

A further modification of the apparatus described is shown in FIG. 2. Here a cylindrical inlet member 18, or series of members 18, is enveloped in resilient sheet material 27 which is attached to the lower front end 26 of the rotor hood or shroud 16. A full-width bar 25A determines the minimum clearance and maximum clearance which may be provided by the cylindrical member or members 18. The limiting bar 25A may be fixed relative to the main frame of the apparatus, or, optionally, may itself be located in forwardly and upwardly directed slots (not shown) to increase the maximum amount of deflection of the tubular inlet member or members 18.

Figure 3:
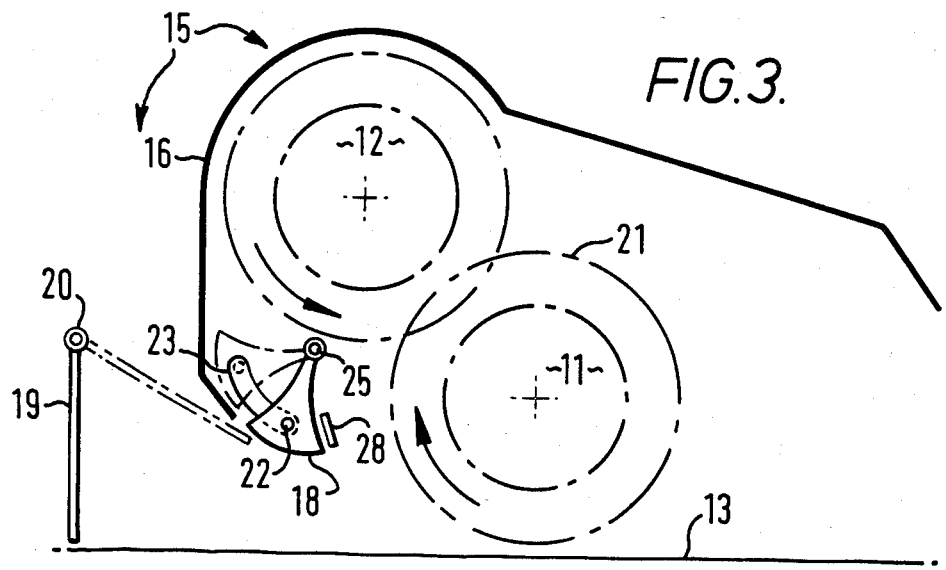
FIG. 3 is a diagrammatic side view of apparatus embodying the invention for picking up cut crop, and including two cooperating conveying or crop treating rotors.

In FIG. 3, there is shown a further embodiment of the invention comprising a self adjusting feed system for a twin-rotor crop engaging unit. Elements corresponding to elements shown in previous figures are indicated by like reference numerals, and this convention is adopted, where appropriate, throughout the figures. In FIG. 3 a second rotor 12 is positioned forwardly and higher than the first rotor 11 and the hood 15 extends over both rotors. A pivotally mounted inlet member 18 is suspended from a transverse rigid bar 25 in pendulum fashion above the crop layer 14 to be picked up. The minimum clearance of the inlet member 18 with the lower rotor 11 is determined by a limit stop 28 mounted on the side plates (not shown) of the rotor housing 15, or by spigots reaching the end of their travel in arcuate slots 23. (Both arrangements are shown in FIG. 3 for purposes of explanation). Again, under increasing crop pressure, the hinged inlet member 18 can be deflected forwardly and upwardly, thus increasing the dimensions of the crop intake duct defined by the rotor 11 and the inlet member 18.

Figure 4:
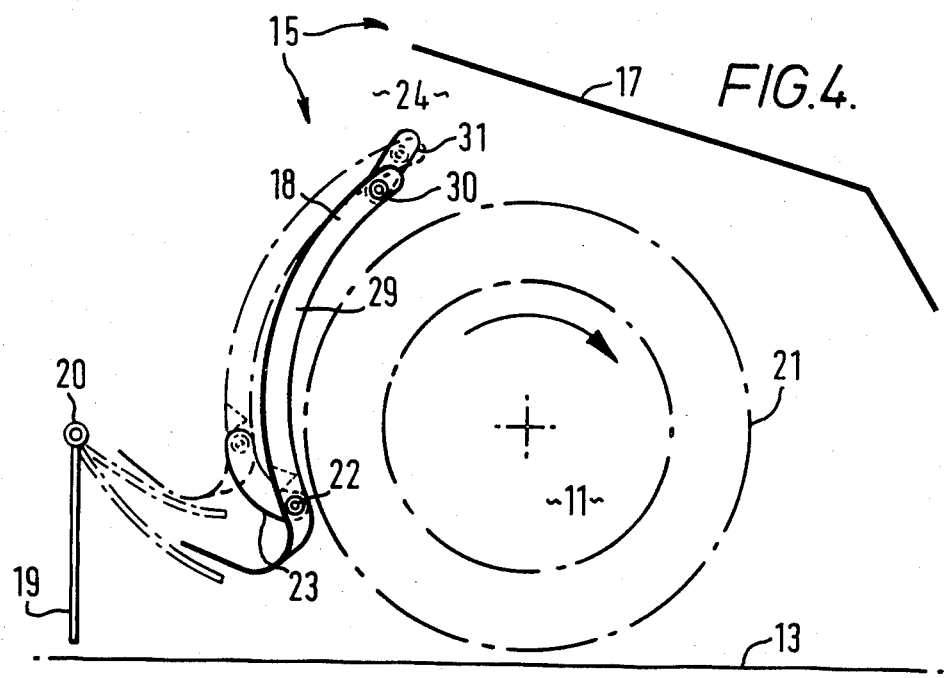
FIG. 4 is a diagrammatic side view of apparatus embodying the invention for picking up cut crop and shows a movable curved hood in front of and partly above a rotor.

In FIG. 4 there is shown a yet further embodiment of the invention, comprising a pick-up apparatus having a rotor 11 engaging crop beneath a hood assembly indicated generally at 15. Again elements corresponding to elements previously described are indicated by like reference numerals. In FIG. 4, a hood member 18 with side flanges 29 is shown to be located by spigots 22 in lower arcuate slots 23, and by spigots 30 in upper linear slots 31. The extreme position to which the hood member 18 can be moved in response to increased crop pressure is shown in broken lines. It will be seen that the upper clearance of the hood member 18 from the rotor 11, and also the angle of the hood member 18, have changed with movement of the hood member 18 from the full line to the broken line positions, in addition to the change brought about at the lower end of the hood member 18. By selecting differing shapes, angles and lengths of slots, a range of effects may be achieved in the movement of the hood member 18. Again, spring loading of the hood member 18 to increase or decrease its resistance to deflection, may be provided. For rotors 11 which are intended to treat the crop, for example by conditioning the crop, a transverse cracking bar may be provided at the lower portion of the hood member 18; the bar may be continuous or may provide an intermittent edge.

Figure 5:
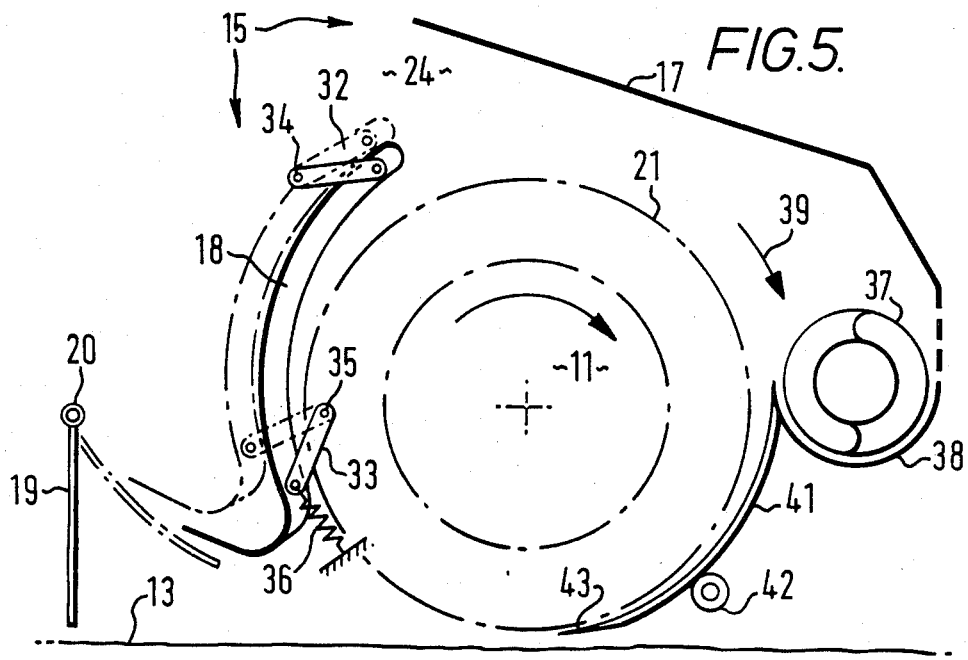
FIG. 5 is a diagrammatic side view of a further apparatus embodying the invention for picking up cut crop, and shows means for returning to the main crop stream any stray crop which falls from the main output stream of a pick-up rotor.

FIG. 5 shows a further modification of the apparatus described thus far, and discloses firstly a modification of the mounting for the hood member 18 of FIG. 4. In FIG. 5 the hood member 18 is shown to be suspended and pivoted on upper and lower link arms 32 and 33 which are pivoted respectively at fixed pivot points 34 and 35 which are fixed relative to the main frame (not shown). The upper and lower link arms 32 and 33 are so dimensioned and angled that, by way of example, the upper end of the hood member 18 moves slightly further away from the periphery 21 of the rotor 11 than does the lower end of the hood member 18, during movement of the hood member 18 from the full line position to the broken line position shown. Also by way of example, the hood member 18 is shown to be spring loaded to increase its resistance to deflection, the spring loading being shown diagrammatically at 36.

It should be appreciated that other forms of hood suspension may be used, including suspensions consisting mainly or entirely of springs or elastomeric elements, to make the hood responsive to changes of load. Elastic links allow additional lateral differentiation in the response to differing crop loads.

FIG. 5 also illustrates a preferred feature of the present invention, concerned with the collection of stray pieces of crop which may escape from the main stream of crop leaving the pick-up rotor. To the rear of the pick-up rotor 11 there is shown a transverse auger 37 which has beneath it a conventional concave trough 38. The main crop stream will leave the rotor 11 generally along the direction indicated diagrammatically by the arrow 39, but some stray pieces of crop will fall downwardly with the rotating rotor 11 and would normally fall to the ground in a region indicated diagrammatically at 40. However, in the embodiment of FIG. 5 there is provided a further concave guide member 41 which leads around, and is spaced from the underside of, the rotor 11. The guide member 41 leads from the forward edge of the trough 38 and terminates just rearwardly of the bottom dead centre position of the rotor 11. A supporting member 42 is positioned to the rear of the guide member 41. The guide member 41 collects stray pieces of crop material and forces them to be guided downwardly and forwardly by the rotor 11 to be re-introduced into the crop layer in front of the rotor 11. For minimum stubble resistance, the guide member 41 may be sharpened at its lower leading edge 43. The support member 42 behind the guide member 41 maintains the guide member 41 in fixed relationship with the rotor 11.

Figure 5A:
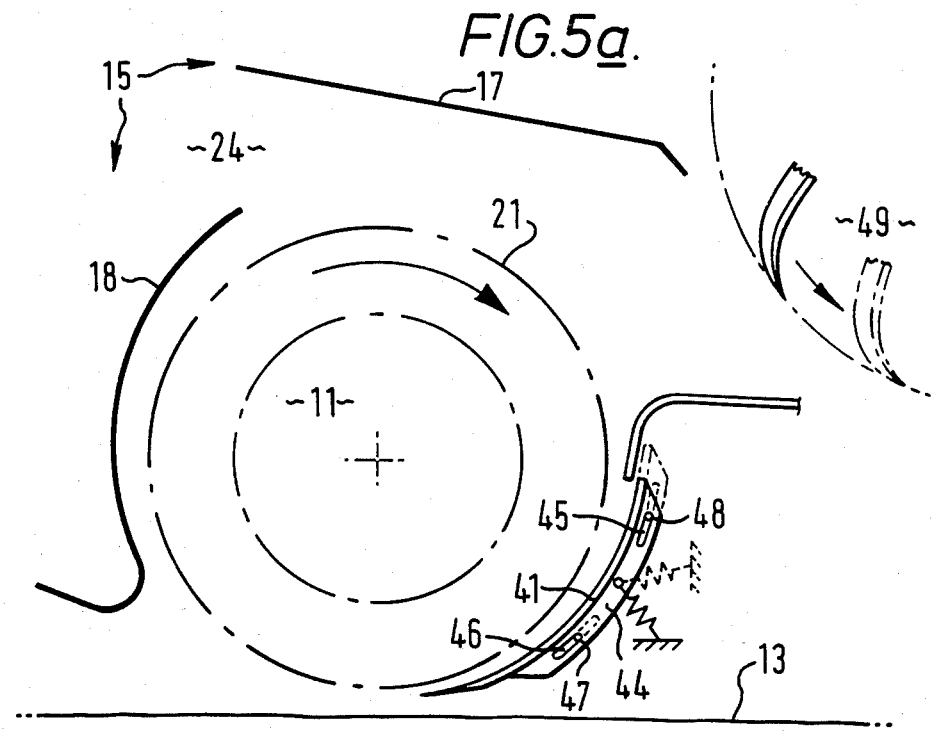
FIG. 5a shows a modification of the apparatus shown in FIG. 4 and is concerned with a movable guide member for returning stray crop to the main crop stream.

FIG. 5a shows a modification of the apparatus of FIG. 5. A first modification is that the crop guide member 41 has side flanges 44 having arcuate slots 45 and 46 which register with spigots 47 and 48 in the rotor side plates (not shown). Alternatively the slots 45 and 46 may cooperate with bars or rollers (not shown) spanning the width of the rotor housing. The purpose of this arrangement is to allow the concave guide member 41 to respond to engagement with stubble, foreign objects on the ground, or undulating ground, by sliding rearwardly and upwardly in an arcuate path. Again spring assistance may be provided urging the guide member 41 upwardly or downwardly.

In the apparatus shown in FIG. 5a, by way of example, the crop collected from the ground is delivered into the path of a steered, multiple-fork conveying device 49.

There will now be described for a further embodiment of the invention which corresponds generally to the embodiments shown in FIGS. 4 and 5, and consists of a crop pick-up apparatus which has been found of particular advantage in practice.

The general main frame of the apparatus is referred to by the numeral 50, and a pick-up rotor 21 is mounted between substantial side plates 51 of the frame 50 and is driven from the pto 52 of a tractor through a conventional drive linkage terminating at 53 (FIG. 6). The rotor 21 is formed of a brush-like structure as set out in our previous published UK Patent Application No. 2075816A, although the corp engaging elements need not necessarily be multi-filamented brush tufts but can be of alternative construction (including a one-piece construction) and can be made from flexible material or resiliently mounted rigid material, and in such cases are preferably shaped to be tapering towards their crop engaging tips, to assist crop detachment and transfer into, for example, a forage harvester feed mechanism.

Figure 6A:
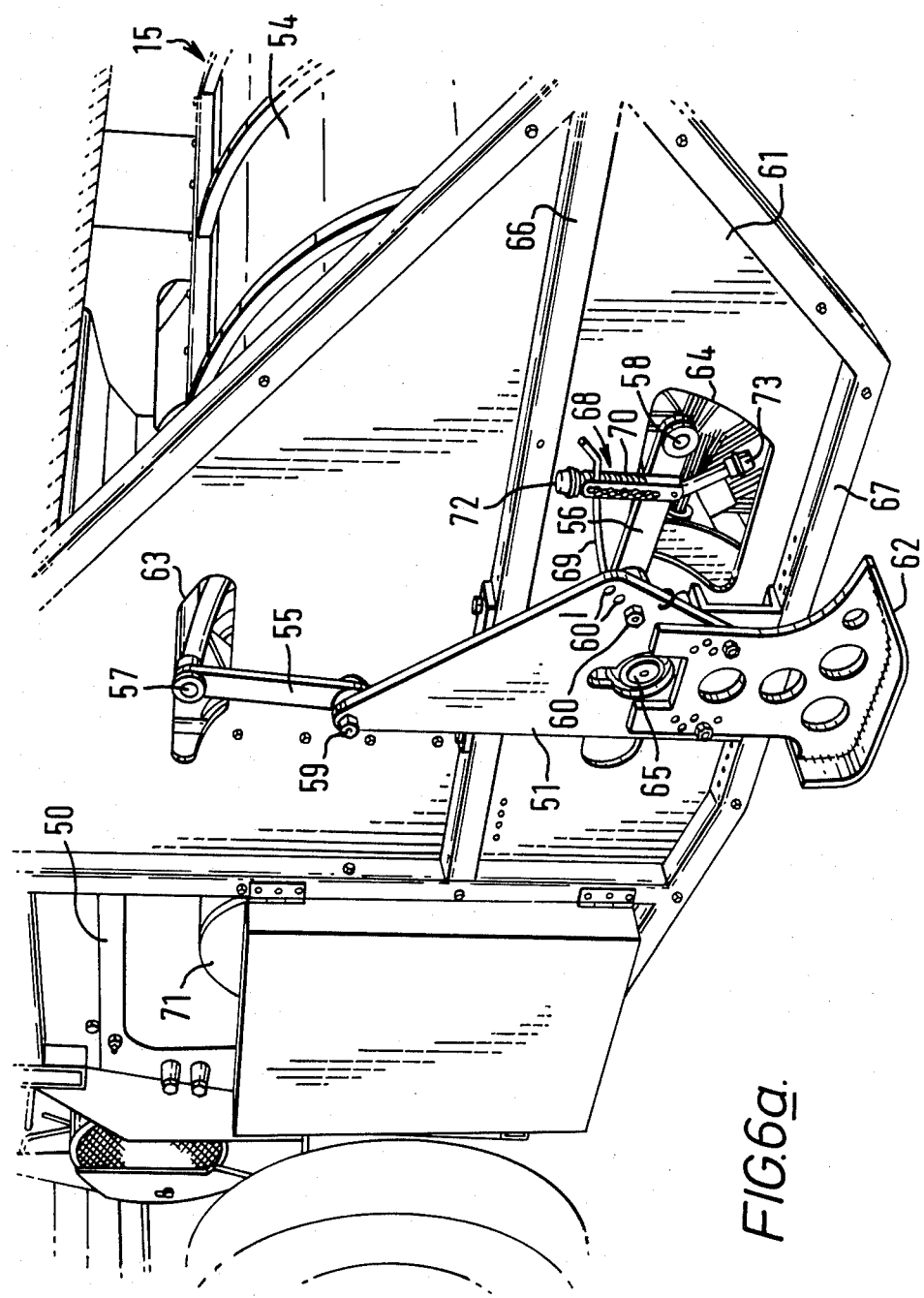

Referring to FIGS. 6 and 6a a curved hood 54 extends over the front of the rotor 21, and in the particular example shown is formed of transparent synthetic plastics material, which allows an operator of the apparatus to view the operation of the rotor. Referring to FIG. 6a, the hood 54 is mounted by two pivoted arms 55 and 56 to the side plate 51 of the main frame 50, and corresponding pivoted arms are provided on the other side of the apparatus. The pivot arm 55 is pivoted to the hood 54 at a pivot 57, and to the side plate 51 at a pivot 59, and the arm 56 is correspondingly pivoted at pivots 58 and 60. Provision is made at apertures 60' for the pivot point 60 to be moved relative to the side plate 51.

The main structure is completed by side panels 61 and side skids 62, repeated on the other side of the apparatus.

In FIG. 6, the hood 54 is shown at its lowermost and most forward position, and the hood is shown at this position in FIG. 7 in full lines. The hood 54 is movable by pivoting on the arms 55 and 56, the pivots 57 and 58 moving in slots 63 and 64 in side panels 61 of the apparatus, of which one is shown in FIG. 6a. The side panels 61 are held in frames having horizontal cross members 66 and 67, and movement of the hood 64 is limited by stops 72 and 73 carried on the arm 56, and bearing against the cross member 66 and 67. A biasing device 68 is linked by an arm 69 to the side frame 51, and biases the hood into the forward and downward position by the effect of the spring 70 acting between the base of the biasing means 68 and the link 69. The apparatus is supported on skids 62 of which one is shown in FIG. 6a secured to the side plate 51.

As shown in FIG. 7, in operation crop is picked up by the rotor 21 and lifted upwardly and rearwardly over the rotor 21 in the direction of the arrow 39 and is fed to an auger 71 which feeds the crop towards a conventional chopping mechanism of a forage harvester, indicated generally at 72 in FIG. 6. As has been explained previously, where the crop load is light, the hood 54 will be in its forward and lower position, but where the crop is heavier, either with a greater bulk or higher friction, or a combination of both, the hood 54 will rise upwardly and rearwardly to allow greater clearances in the crop passage between the hood 54 and the rotor 21.

Figure 8:
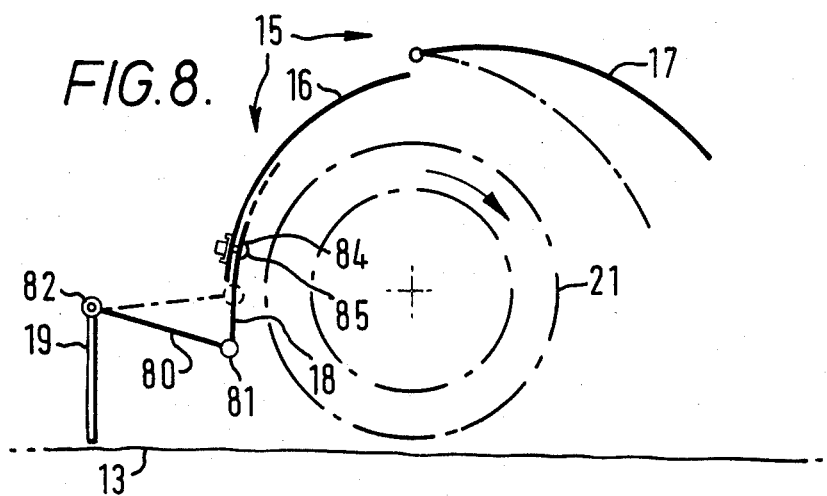
FIG. 8 is a diagrammatic side view of a yet further form of a crop pick up apparatus embodying the invention, in which a front portion of a hood above a rotor is movable.
Figure 9A:
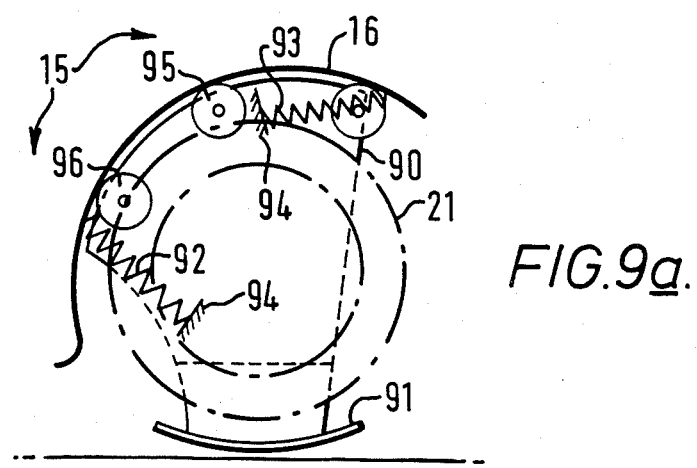
FIGS. 9a and 9b are diagrammatic side and front views respectively of a further modification of a crop pick up apparatus embodying the invention, in which a curved portion of a hood over the rotor is movable along a circular path.
Figure 9B:
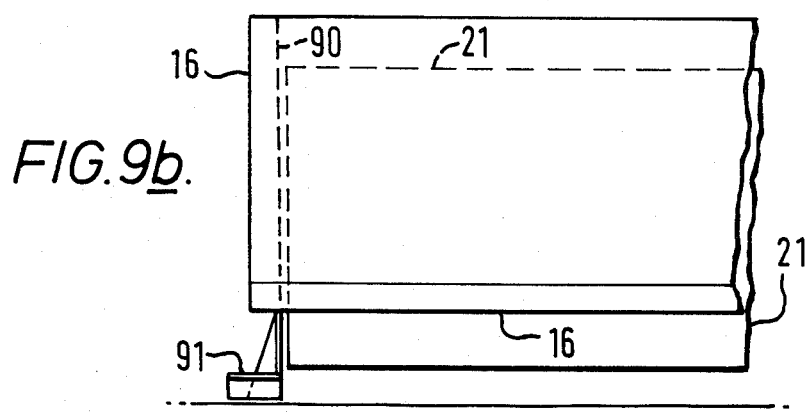

Referring now to FIG. 8, there is shown a diagrammatic side view of a further embodiment of the invention, and in this figure and in FIGS. 9a and 9b, reference numerals will be used which corresponds generally to those used previously in FIGS. 1, 2 and 5.

In FIG. 8 a hood is indicated generally at 15, and comprises a fixed hood member 16, a curved movable hood member 18, and an overhead baffle 17. A safety curtain 19 is provided hung from a rail 82.

The movable portion of the hood 15 comprises two hinged plates 80 and 18 which are hingably attached to the suspension rail 82 for the safety curtain 19. The rear section 18 of the hinged front arrangement is slotted at 84 so that the section 18 can slide up and down on coach-headed bolts 85 or other attachment means, which are attached to the underside of the fixed upper hood portion 16. The ends of the slots 84 limit the upward and downward movement of the hood section 18. By placing the first pivot on the rail 82 in different positions and arranging the lower front edge of the fixed rotor hood member 16 to suit particular requirements, a wide range of intake arrangements can be achieved. Instead of slots and pin fastening, dowels attached to the second pivoted plate 18 of the front arrangement may be made to protrude through side plates of the rotor housing and may be guided in appropriately shaped slots (not shown). Alternatively, the second section 18 of the movable hood portion may be spring-loaded near its upstream end towards the underside of the fixed rotor hood member 16. Hinge stops in such an arrangement would limit the downward movement of the movable hood portion. There is also shown a deflector 17 at the rear of the fixed hood portion 16 which can be pivoted to direct the crop stream into different trajectories, including steeply downwards.

In FIGS. 9a and 9b there are shown in diagrammatic side cross section and front view respectively a pick-up rotor for picking up crop on the ground, and embodying the invention. Side plates 90 attached to a ground skid 91 on each side of the apparatus are shaped at the top to support a rotor hood 16' which laterally overhangs the side plates 90. The hood 16' is secured only by two or more springs 92 and 93 which are shown diagrammatically coupled between the hood 16 and securing portions 94 of the side plates 90. The directional pull of the springs 92 and 93 is arranged to be downwardly and forwardly at the front against limit stops (not shown) and towards the rotor centre against resilient buffers (also not shown) which prevent noise arising from metal-to-metal contact. Small rubber wheels or rollers 95 and 96 produce the desired damping effect and reduce sliding friction of the hood 16' sliding across the top of the side plates 90. Thus the hood 16' is free to respond to varying crop loads by lifting at one side or both sides as far around the covered rotor periphery as the load dictates. The springs and their direction of fitting shown are merely an example, and it should be noted that compression or tension springs can be used, including telescopic spring loaded arms. It should also be noted that the rotor hood 16' may have one or more transverse hinges (not shown) which, in combination with the springs arranged to act near the hinged axes, to give maximum freedom of response.

With reference to FIGS. 9a and b, there is provided in essence, a rotor cover which is wider than the lateral spacing of the rotor housing side plates, so that the upper edges of the side plates form the lower limit stops and movement of the housing above the side plates can correspond to the extension of independent elastic links in a non-predetermined path. Advantageously rollers or wheels attached near the upper ends of the side plates support and guide the overhanging rotor cover and minimise sliding friction. The rollers or wheels may be made from resilient material to cushion the return movement of the rotor housing.

It is to be appreciated that where there is provided a resiliently suspended hood or rotor cover, it is only necessary that one or the other of the said horizontal and vertical intake clearances need change at any particular time, although both may change together. It is also to be appreciated that there can be a difference in one or other of these clearances from one side of the hood to the other transversely across the machine.

In some aspects, the invention may be regarded as concerning a crop rotor housing which is mounted in such a way that the vertical and/or horizontal intake clearance can vary in response to varying crop loads, with provision for all or part of the rotor cover to move circumferentially relative to the rotor.

Various references are made in this specification to variations in crop load. By the term crop load is meant the amount and/or the nature of the crop picked up and conveyed by the rotor. For example the crop load may be increased by an increase in the amount of crop conveyed by the rotor, or by an increase in the friction exerted by the crop conveyed by the rotor, or by both factors. Friction may be increased for example by an increase in wetness of the crop.

A further embodiment of the invention will now be described with reference to FIG. 10, which is a diagrammatic side view of a pick-up header for a forage harvester, self-loading forage waggon, or baling machine. Essentially it consists of side plates 130 which are pivoted on brackets 131 on the bottom rear and can be lifted or lowered relative to the ground by a small hydraulic ram 132 acting on a bracket 133 at the upper rear. Skids 134 under the rotor centre prevent unnecessary ground contact to be made by the pick-up rotor 126, the skids being height adjustable. From the front of a transverse bar 135 joining the side plates 130 of the unit hangs a stiff curtain 136 which prevents crop and foreign objects being projected forwardly and in operation guides the crop into the intake portion of the rotor housing 127. The front part of the housing 127 is pivoted so that it is able to respond automatically to differing amounts of crop bulk in the windrow. The next and subsequent portions of the rotor cover 127 are also pivoted, and adjustable stops on both end plates may be set so that they allow a pre-determined minimum clearance between the crop engaging elements and the rotor cover 127 to be maintained. Depending on the quantity of crop passing into the machine, either one or both sections of the cover 127 may be lifted to accommodate the crop. This is shown by the broken lines. The hood sections, being made of light material, can thus exert gentle pressure on the crop stream, keeping it in contact with the elements. Before the top-dead-centre position is reached by the crop the hood structure 127 begins to diverge from the rotor 126, allowing the crop to detach itself from the elements, to be delivered into the feed intake of the harvesting machine. An optional stripping rotor 137 behind the pick-up rotor 126 ensures that stray material is collected and also directed into the intake of the harvester.

Figure 10:
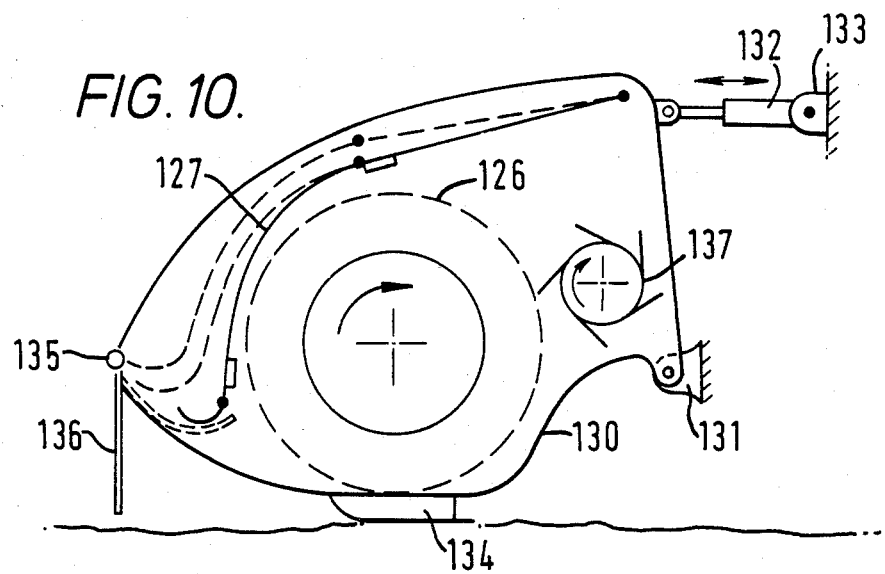
FIG. 10 is a diagrammatic side view of a further embodiment of the invention for picking up cut crop.

The pick up rotor 126 shown in FIG. 10 may take a number of different forms. For example conveniently the rotor comprises support means and, secured to the support means, a plurality of outwardly extending crop engaging elements. In one preferred form, each crop engaging element comprises a discrete arm. Conveniently the element is a flat strip of stiff resilient material, for example synthetic plastics material, and the element may be arranged to be yieldable either by virtue of the resilience of the material itself, and/or by virtue of a resilient mounting means which allows pivoting, rocking and/or twisting. In some forms of the invention, each crop engaging element may comprise a triangular, parallelogram shaped, or trapezoidal projection formed from flat sheet-like material and secured to the support means with the flat face of the element transverse to the direction of crop flow. In some preferred forms a number of successive elements along the said transverse array comprise outwardly extending projections extending from a common base portion secured to the support means.

In another preferred form, the crop engaging elements form a brush like structure of stiff, resilient elongate elements, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements. Such a brush-like structure may take any of the forms set out in our published UK Patent Application Nos. 8012426 and 8121637.

It is particularly preferred in this form that the elements are arranged in spaced apart tufts of elements and in which each tuft is formed of one or more lengths of element material doubled over and secured to a supporting base in the region of the fold of the doubled over element length or lengths, each group of elements in a tuft being supported and protected at the base thereof by a sleeve of resilient material.

Conveniently the said elements are made of stiff resilient material, for example synthetic plastics material, conveniently nylon, polypropylene or polyethylene, or of spring steel, although rigid non-resilient material may be used.

Figure 13:
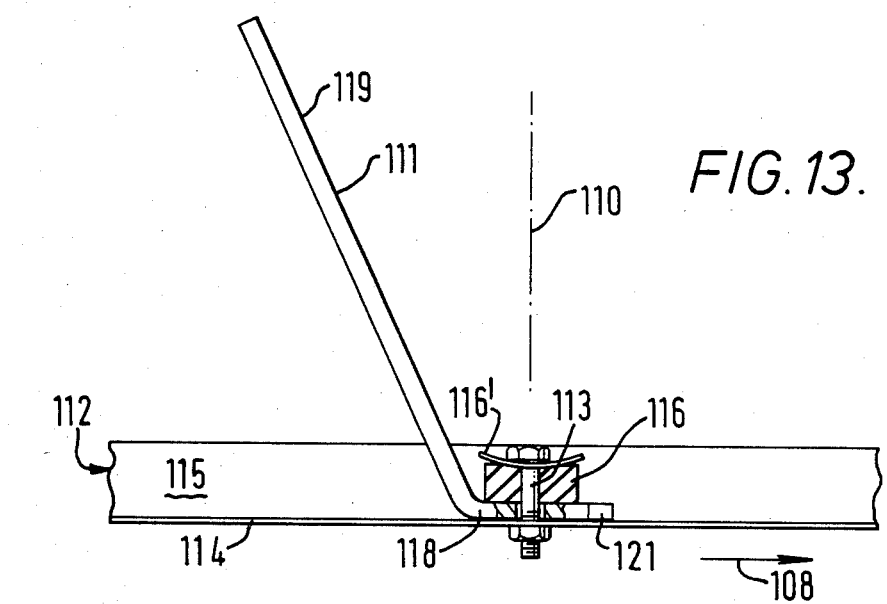
Figure 13A:
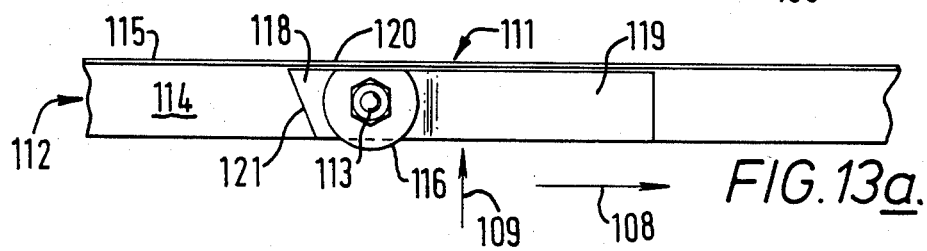
Figure 11:
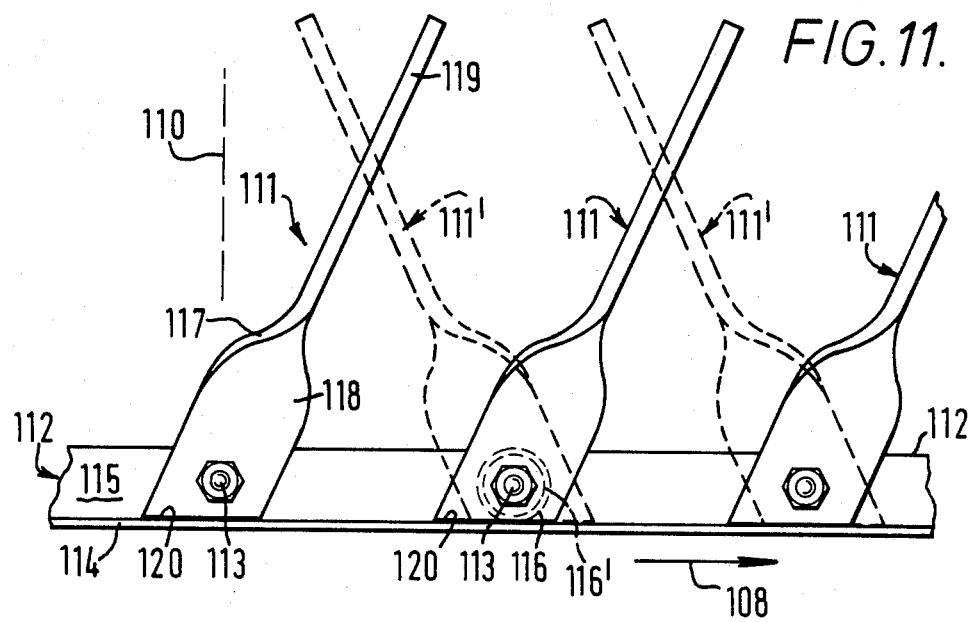
Figure 11A:
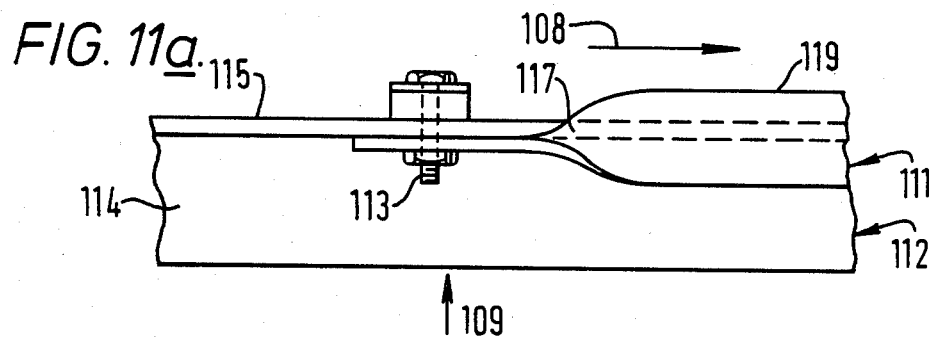
Figure 11B:
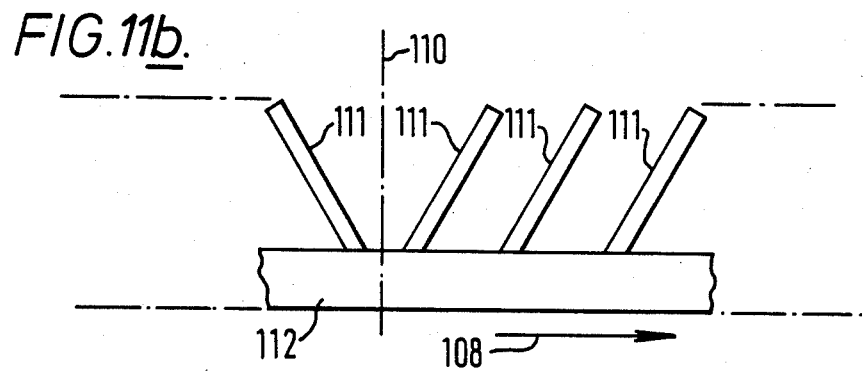
Figure 14:
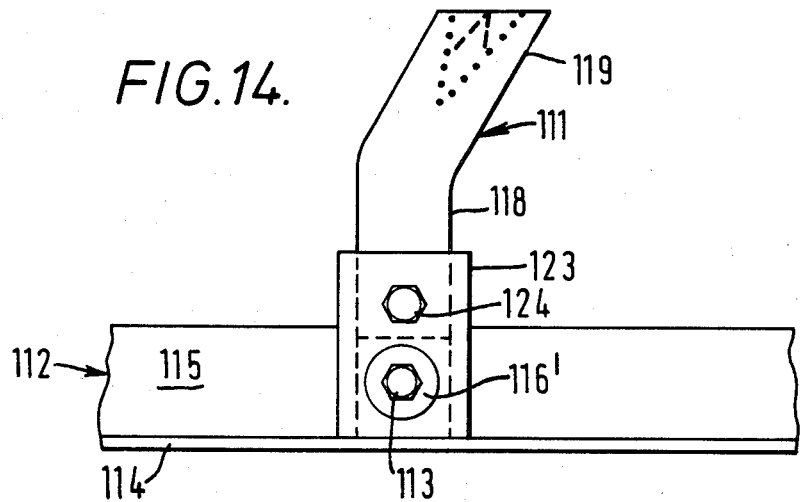
Figure 15:
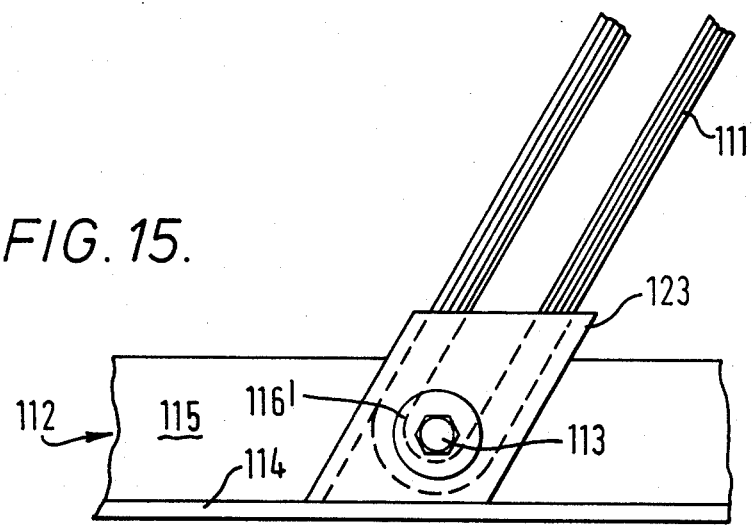

There will now be described some examples of forms of pick-up rotor which may be used in the arrangement showing FIG. 10, and reference will be made to FIGS. 11 to 15. In these Figures, FIG. 11 and 11a are rear and plan views respectively of part of a crop engaging device suitable for use on a rotor embodying the invention; FIG. 11b is a diagrammatic representation showing a change of direction of an array of a crop engaging device embodying the invention; FIGS. 12 and 12a are rear and side views respectively of a part of an alternative crop engaging device embodying the invention; FIG. 12b is a rear view of a modification of the embodiment shown in FIGS. 12 and 12a; FIG. 13 shows a rear view of another form of a single crop engaging element embodying the invention; FIG. 13a shows a plan view of an element such as shown in FIG. 13, but of opposite hand; FIGS. 14 and 14a show rear and side view respectively of a further alternative form of crop engaging element, suitable for manufacture from plastics material and for use in a pick-up rotor; and FIG. 15 shows a rear view of a further form of crop engaging element, comprising a tuft of elements forming part of a brush like structure.

Referring firstly to FIGS. 11 and 11a, there is shown in rear view part of an array (extending in a direction 108) of crop engaging elements 111 embodying the invention, secured to a transverse mounting bar 112 by bolts 113. In full lines in the Figure are shown elements 111 bolted to the mounting bar 112, and in dotted lines are shown elements 111' which are mounted on a second mounting bar (not shown) which is spaced from the first bar along the direction 109 of travel of the crop, which is generally in a direction perpendicular to the plane of FIG. 11.

The mounting bar 112 comprises a right angle section bar having an upstanding leading flange 115 and a base flange 114 perpendicular to the flange 115. Where the crop engaging element 111 is formed of resilient material, for example thick stiff resilient plastics material, the element can be bolted directed to the leading flange 115 by a simple nut and bolt arrangement with suitable washers. Where the element 111 is made of rigid material such as steel, the element is mounted by the bolt 113 passing through a resilient component such as a compression spring, or a rubber cone, which is indicated in dotted lines at 116. The middle element shown in FIG. 11 is an alternative to the left and right elements 111 in FIG. 11, and would not normally be mounted on the same mounting bar. Details of such flexible arrangements for the crop engaging elements will be described in more detail hereinafter.

Each crop engaging element 111 comprises a base portion 118 and a crop engaging portion 119, formed by a flat elongate strip which is twisted through an angle of 90° at a region indicated at 117, closer to the fastening means 113 than to the distal end of the element 111. The base portion 118 of the element 111 below the twist 117 is secured to the flange 115 by the bolt 113, and terminates in an edge 120 which is cut at a slanting angle to the general longitudinal axis of the element 111, and abuts firmly against the flange 114 of the angle bar 112. Such an arrangement prevents or inhibits rotation of the element 111 about the axis of the fastening means 113. In the case of the centre element 111 fastened by the resilient mounting means 116, the abutment of the surface 120 against the flange 114 prevents rotation about the bolt 113, but allows rear-ward movement of the element 111 upon striking an object heavier than crop, by a rearward pivoting action about the edge 120, upon compression of the resilient mounting means 116. This resilient component can be introduced at the leading or trailing end of the mounting bolt 113 as will become apparent from description hereinafter.

To increase the resistance of elements 111 to rotation in the clockwise sense, the holes for mounting bolt 113 may be drilled off-centre to the left and/or lower than shown. For elements 111' the holes would be displaced similarly but to the right of centre, as viewed in the figure.

FIGS. 12 and 12a show rear and side views respectively of an alternative embodiment of the invention comprising part of an array of crop engaging elements 111 and components which corresponds to components shown in previous figures are referred to by like reference numerals. However the crop engaging elements 111 shown in FIGS. 12 and 12a differ from those shown in the previous figures in an important aspect, which is that the elements 111 in FIG. 12 are not discrete arms in the sense of elongate parallel sided, inclined arms, but are triangular projections extending outwardly from the mounting bar 112. Two different kinds of element 111 are shown in FIG. 12. The left element 111 consist of a triangular sheet of material having a base edge 120 abutting the base trailing flange of the mounting bar 112, and having two side edges 106 and 104 inclined to each other to form the outwardly extending projection. The side edge 104 is perpendicular to the flange 114, and the edge 106 constitutes a principal crop engaging edge or region, which is inclined to the axis 110 perpendicular to the transverse direction 108 of the array. A plurality of the elements 111 are provided along the mounting bar 112, each having a principal crop engaging edge or region 106 which is inclined in the same sense.

In the modification of the right-hand element 111 in FIG. 12, the side edge 104 is also inclined to the axis 110, and is inclined in the same sense as the principal crop engaging edge or region 106.

Conveniently the elements 111 of FIG. 12 can be formed of a sheet of thick stiff resilient material such as synthetic plastics material, and where the material is itself resilient, the element 111 can be bolted directly to the upstanding flange 115 of the mounting bar 112. However in some cases the elements 111 can be formed of non-resilient material such as metal, and in such a case the element is resiliently mounted, for example as shown in FIG. 12a by a retaining bolt 113 passing through a rubber bush 116 and metal washer 116', to allow pivoting of the element 111 rearwardly in response to excess load on the element.

Where a right-angled triangle is used as shown in the left element 111, the attachment hole for the bolt 113 is positioned approximately central of the base portion 118, but with an acute triangle as shown on the right-hand side, the bolt 113 is positioned offset from the centre of the base region 118, offset towards the principal crop engaging edge 106.

In FIG. 12b there is shown a modification of the embodiment of FIGS. 12 and 12a. In the modification of FIG. 12b each of the crop engaging elements 111 consists of an outwardly extending projection 105 extending from a common base 107 which is secured to the mounting bar 112 by bolts 113. In such an arrangement, preferably the material of the elements 111 is resilient material, allowing individual elements 111 to bend rearwardly in response to excess load, but instead, or in addition, the bolts 113 may pass through rubber bushes, or springs, as has been shown in FIG. 12a, to allow the whole set of elements 111 to pivot rearwardly with their common base 107, in response to excess load. In effect the elements 111 together with the common base 107 form a transverse rib, and the section of rib may vary in width up to the full width of the rotor.

By way of example of dimensions which may be used in the embodiments shown in FIG. 12b, the following are given:

| | |
|---|---|
| Thickness of sheet material forming elements 111 | 5 to 6 mm |
| Angle between principal crop engaging edge 106 and axis 110 | 25° |
| Width of crop engaging element 111 in direction 108, at outer tip | 10 mm |
| Notional width of crop engaging element 111 at edge 120 (indicated by dashed lines 103) | 75 mm |
| Length of crop engaging element 111 from edge 120 to outer tip of element 111 | 180 mm |
| Depth of each flange 114 or 115 of support bar 112 | 40 mm |

FIG. 13 shows a single-arm element 111 made of rigid material mounted on the flat web 114 of an angle bar 112 in such a way that in response to a heavy tip load it can rock for and aft as well as laterally, by compression of the rubber cushion 116. FIG. 13a shows a plan view of an opposite handed element 111. The base portion 118 of the element 111 which lies parallel to the flat web 114 of the mounting bar 112 is cut at an angle at an edge 121 so that extra resistance to twisting is obtained in response to a heavy lateral load on the element acting towards to mounting bolt. The element 111 will then pivot about the raked-back line of the cut end at 121. Again, the resilient component 116 can be either formed in various shapes of rubber, or can be steel springs, and they may be fitted in contact with the flat part 118 of the crop engaging element 111, or the opposite side of the web 114 of the mounting bar 112. The slanted end 121 of the crop engaging element 111 is optional, and the degree of slant can be varied.

It is to be noted that the element 111 of FIGS. 11 and 12 differs basically from element 111 of FIGS. 13 and 13a in that the base portion 18 of each element is in the one case secured to the leading upright web 115 of the mounting bar 112, and in the other case is secured to the base flange 114 of the mounting bar 112. The function of the edge 120 in FIGS. 11 and 12 in locking the element 111 against rotation about the bolt 113, is performed in the element of FIGS. 13 and 13a by the leading side edge 120 shown in plan view as abutting the upright leading flange 115 of the mounting bar 112.

FIG. 14 shows a thick-walled tubular plastic sleeve 123 attached radially by means of a fixing bolt 113 and protective washer 116 to an angle-section mounting bar 112. Set tightly into the sleeve 122 and secured by a small bolt or rivet 124 is an element 111 having an angled tip portion 119, the element 111 being made conveniently of sheet plastics material. The extreme tip of portion 119 may be as indicated by the full lines, or it may have the portion indicated by the dotted lines removed to form a 2-pronged shape, or, as yet another alternative, only the small triangles indicated by the broken lines may be removed to form a coarsely serrated leading edge. This element 111 is prevented from pivoting about the fixing bolt 124 by the square-cut end of the tubular sleeve 123, but it can be deflected rearwardly and laterally, or can twist, by virtue of the resilience of the sleeve 123 and of the tip material.

In FIG. 15 a similar sleeve 123 but cut at an angle to the plane of a mounting bar 112 is used to retain a number of plastic filament elements 111 which are bent double and inserted in the sleeve 123 prior to securing it by a fixing bolt and washer to the radial or near-radial web of the bar. Advantages of the elements 111 shown in FIGS. 14 and 15 are their broad working width and their multi-filamented construction and resilience which assist in collecting crop from the ground. The plastic filament elements 111 as shown in FIG. 15 are thin enough, at approximately 3 to 8 mm diameter, to deflect in almost any direction.

Depending on the various applications illustrated rotor diameters may vary from approximately 0.3 to 1.0 m diameter, the preferred range being 0.4 to 0.6 m diameter. Tip speeds of the crop engaging elements may vary within the approximate range of 3 to 30 m/s, mainly 10 to 23 m/s. The inclinations of the crop engaging elements to the transverse rotor axis will normally be 45° to 75°, but slightly greater and lesser angles are not excluded for specific purposes.

What I claim is:

1. Apparatus for picking up and conveying crop comprising:
    a mobile frame for movement across the ground;
    a conveying rotor mounted for rotation about an axis transverse to the direction of forward movement of the apparatus and substantially parallel to the ground for picking up and conveying crop;
    a hood extending around at least part of the front half of the rotor and defining between the hood and part of the outer periphery of the rotor a crop flow passage along which crop is conveyed by the rotor;
    drive means for driving the conveying rotor in rotation in a sense such that the rotor picks up crop and conveys the crop upwardly and rearwardly over the rotor, the drive means being arranged to drive the rotor in rotation at a speed such that the rotor accelerates the crop during movement of the crop through the restriction defined between the hood and the periphery of the rotor; such that, at least during acceleration, the periphery of the rotor moves faster than the crop; and such that, after the conveying, the crop is released from the rotor at least predominantly by centrifugal effect; and mounting means for mounting said hood on said frame so as to be moveable relative to the frame during operation of the apparatus, the hood being moveable in response to, and by the effect of, the crop to effect automatic adjustment of the clearance at the entrance to the crop flow passage, said mounting means constraining said hood to move along a substantially predetermined path, said hood being mounted in such a manner that an increase in crop load produces circumferential movement of the hood in the direction of crop flow along a curved path spaced from and lying around the outer periphery of the rotor, and increases both the vertical clearance between the front of the hood and the ground and the horizontal clearance between the front of the hood and the rotor at the entrance to the crop flow passage.

2. Apparatus according to claim 1 including adjustment means for selectively varying the predetermined path of movement of the hood.

3. Apparatus according to claim 1 in which the said predetermined path produces different variations of clearances at the entrance and exit of the crop flow passage during movement of the hood.

4. Apparatus according to claim 1 in which the said hood is movable in response to, and by the effect of, an increase in crop load to effect an overall increase in the clearance presented to the crop along the crop flow passage.

5. Apparatus according to claim 1, including resiliant biasing means for biasing the hood towards a first position in which the entrance to the crop passage is restricted to a greater extent, and is movable in response to, and by the effect of, crop towards a second position in which the entrance to the crop passage is restricted to a lesser extent.

6. Apparatus according claim 1, in which the said mounting means comprises at least two mounting linkages spaced apart along the direction of the crop flow passage.

7. Apparatus according to claim 6 in which each mounting linkage is a pivotal mounting linkage pivoted to the hood and to the frame, the spacing between the pivots on the linkages being different for different linkages along the crop passage, so that a different variation of clearance occurs at different positions along the crop passage.

8. Apparatus according to claim 6 in which each said mounting linkage comprises arms pivoted at one end to the hood, and pivoted at the other end to the frame.

9. A method of picking up and conveying crop comprising the steps of:

moving a mobile frame across the ground;

rotating a conveying rotor about an axis transverse to the direction of forward movement of the apparatus and substantially parallel to the ground for picking up and conveying crop;

picking up crop by the rotor and carrying the crop upwardly and rearwardly over the rotor along a crop flow passage defined between a hood, extending around at least part of the front half of the rotor, and part of the outer periphery of the rotor, driving the rotor in rotation at a speed such that the rotor accelerates the crop during movement of the crop through the restriction defined between the hood and the periphery of the rotor; such that, at least during acceleration, the periphery of the rotor moves faster than the crop; and such that, after the conveying, the crop is released from the rotor at least predominantly by centrifugal effect; and automatically adjusting the clearance at the entrance to the crop flow passage by moving the hood relative to the frame during operation, in response to, and by the effect of, the crop, the hood movement being such that an increase in crop load produces circumferential movement of the hood in the direction of crop flow along a substantially predetermined path spaced from and lying around the outer periphery of the rotor, and increases both the vertical clearance between the front of the hood and the ground and the horizontal clearance between the front of the hood and the rotor at the entrance to the crop flow passage.

* * * * *